US011016253B1

(12) United States Patent
Puckett et al.

(10) Patent No.: US 11,016,253 B1
(45) Date of Patent: May 25, 2021

(54) ADIABATIC WAVEGUIDE COUPLERS WITH ULTRA-LOW BACK-REFLECTION

(71) Applicant: Honeywell International Inc., Morris Plains, NJ (US)

(72) Inventors: Matthew Wade Puckett, Phoenix, AZ (US); Neil A. Krueger, Saint Paul, MN (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/895,295

(22) Filed: Jun. 8, 2020

(51) Int. Cl.
*H04B 10/00* (2013.01)
*G02B 6/42* (2006.01)

(52) U.S. Cl.
CPC ......... *G02B 6/4273* (2013.01); *G02B 6/4212* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,048,909 A * | 9/1991 | Henry | ..................... | G01D 5/268 385/27 |
| 5,627,928 A * | 5/1997 | Matsuura | ........... | G02B 6/12007 385/132 |
| 6,269,211 B1 * | 7/2001 | Hatayama | ............ | G02B 6/1228 385/129 |
| 6,351,581 B1 | 2/2002 | Doerr et al. | | |
| 6,396,984 B1 * | 5/2002 | Cho | ..................... | G02B 6/1228 385/28 |
| 6,920,266 B2 * | 7/2005 | Blume | ................. | G02B 6/1228 385/28 |
| 7,106,448 B1 | 9/2006 | Vawter et al. | | |
| 7,577,327 B2 * | 8/2009 | Blauvelt | ............ | G02B 6/12002 385/129 |
| 7,693,367 B2 * | 4/2010 | Nakai | .................. | G02B 6/2835 385/28 |
| 9,261,647 B1 * | 2/2016 | Cox | ......................... | G02B 6/12 |
| 9,322,997 B2 | 4/2016 | Peng | | |

(Continued)

OTHER PUBLICATIONS

Khilo et al., "Efficient planar fiber-to-chip coupler based on two-stage adiabatic evolution", Optics Express 15790, Jul. 19, 2010, pp. 1 through 17, vol. 18, No. 15, Optical Society of America.

*Primary Examiner* — Agustin Bello
(74) *Attorney, Agent, or Firm* — Fogg & Powers LLC

(57) ABSTRACT

An optical coupler comprises an adiabatic waveguide structure having a proximal end and a distal end, with the adiabatic waveguide structure comprising: a first waveguide comprising an input section at the proximal end; a first coupling section contiguous with the input section and extending toward the distal end; and a first laterally displaced section contiguous with the first coupling section. The first waveguide narrows along the first coupling section, from the input section to the first laterally displaced section. A second waveguide is separate from the first waveguide and comprises a second laterally displaced section adjacent to the proximal end; a second coupling section contiguous with the second laterally displaced section and extending toward the distal end; and an output section contiguous with the second coupling section. The second waveguide widens along the second coupling section, from the second laterally displaced section to the output section.

13 Claims, 8 Drawing Sheets

(56) References Cited

U.S. PATENT DOCUMENTS

| | | | |
|---|---|---|---|
| 9,435,946 B2* | 9/2016 | Sakakibara | G02B 6/12002 |
| 9,664,855 B2* | 5/2017 | Sodagar | G02B 6/262 |
| 9,703,047 B2 | 7/2017 | Painchaud et al. | |
| 9,759,864 B2* | 9/2017 | Painchaud | G02B 6/1228 |
| 9,880,356 B2* | 1/2018 | Latawiec | G02B 6/29341 |
| 10,416,388 B2* | 9/2019 | Kataoka | G02B 6/2804 |
| 10,534,136 B1* | 1/2020 | Puckett | G02B 6/305 |
| 10,663,663 B2* | 5/2020 | Painchaud | G02B 6/1228 |
| 2012/0230635 A1* | 9/2012 | Yoshida | G02B 6/125 385/43 |
| 2013/0170807 A1* | 7/2013 | Hatori | G02B 6/036 385/129 |
| 2013/0188910 A1* | 7/2013 | Tokushima | G02B 6/1228 385/28 |
| 2013/0229809 A1* | 9/2013 | Hatori | G02B 6/1228 362/311.01 |
| 2014/0233881 A1* | 8/2014 | Hatori | G02B 6/1228 385/14 |
| 2016/0327741 A1* | 11/2016 | Wu | G02B 6/125 |
| 2019/0199440 A1* | 6/2019 | Gross | H04J 14/04 |
| 2019/0265410 A1* | 8/2019 | Testa | G02B 6/12002 |
| 2020/0264391 A1* | 8/2020 | Tummidi | G02B 6/424 |
| 2020/0319409 A1* | 10/2020 | Su | H04B 10/505 |
| 2020/0333535 A1* | 10/2020 | Tsang | H04B 10/27 |

* cited by examiner

US 11,016,253 B1

ADIABATIC WAVEGUIDE COUPLERS WITH ULTRA-LOW BACK-REFLECTION

BACKGROUND

In integrated photonics, there are many applications which require that light be transitioned between two waveguides. Often, these two waveguides may exist on separate vertical layers of the chip. For example, integrated optical frequency combs may require light to be efficiently coupled from an optical fiber into a first, intermediate waveguide layer, and then transitioned from this intermediate waveguide layer into a higher confinement, comb-generating layer. A resonator fiber optic gyroscope (RFOG) with an integrated photonics component typically requires similar transitions.

Current structures used to transition light between waveguides can have the unwanted effect of producing nonnegligible back-reflections, which can limit their usefulness and compromise performance. In an RFOG in particular, it is critical that back-reflections remain as low as possible, especially within the resonator path, to maximize bias stability.

SUMMARY

An optical coupler comprises an adiabatic waveguide structure having a proximal end and a distal end, with the adiabatic waveguide structure comprising: a first waveguide comprising an input section at the proximal end; a first coupling section contiguous with the input section and extending toward the distal end; and a first laterally displaced section contiguous with the first coupling section and terminating adjacent to the distal end. The first waveguide narrows along the first coupling section, from the input section to the first laterally displaced section. The adiabatic waveguide structure also comprises a second waveguide separate from the first waveguide, with the second waveguide comprising a second laterally displaced section adjacent to the proximal end; a second coupling section contiguous with the second laterally displaced section and extending toward the distal end; and an output section contiguous with the second coupling section and terminating at the distal end. The second waveguide widens along the second coupling section, from the second laterally displaced section to the output section.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Figure 1:
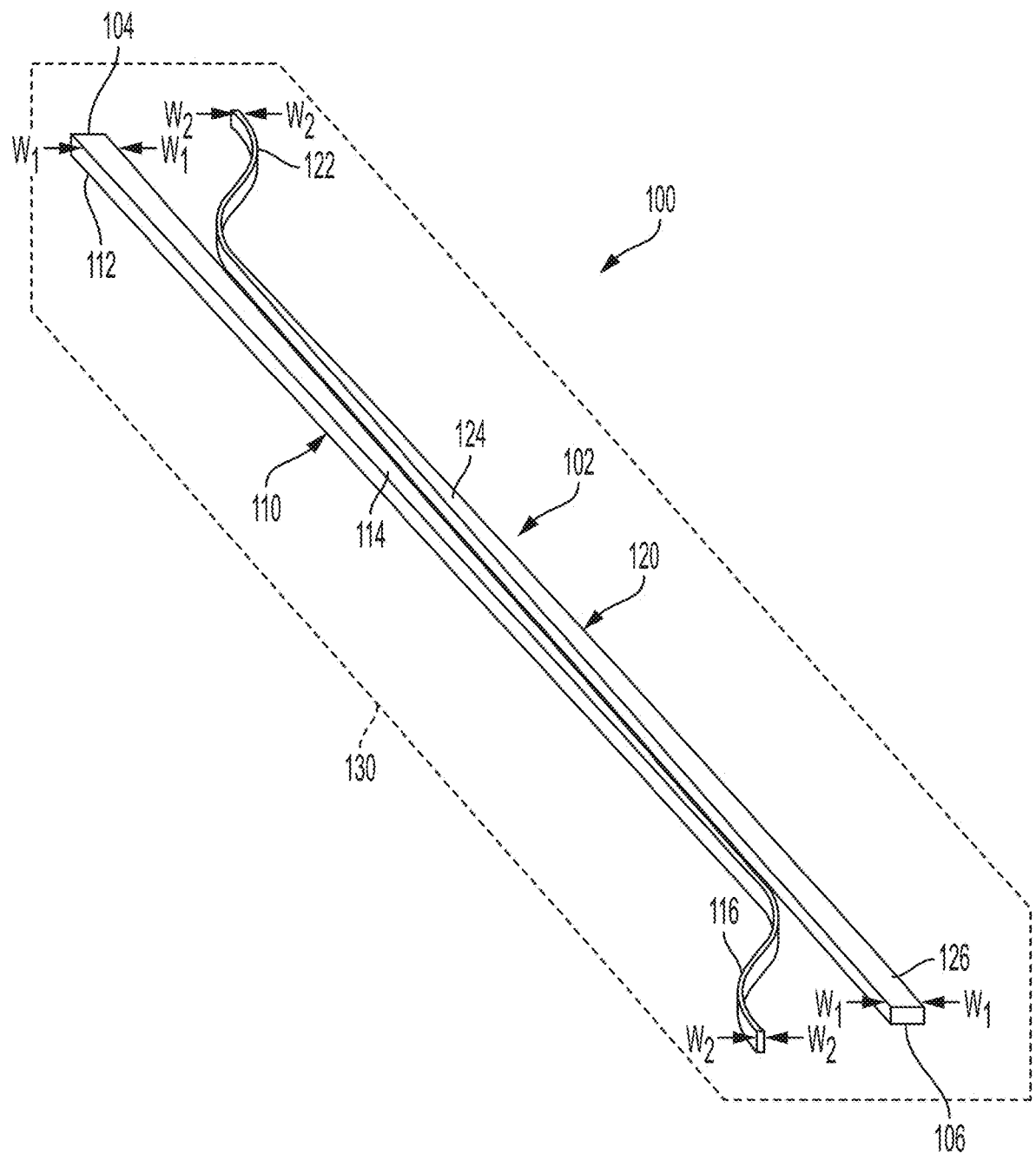
FIG. 1 is a schematic orthogonal view of an adiabatic optical waveguide coupler, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Adiabatic optical waveguide couplers with ultra-low back-reflection are described herein.

In prior approaches, adiabatic light couplers are designed such that light propagates along an initial waveguide, and at some point along that waveguide's length, a second waveguide is abruptly introduced. The second waveguide's width is made to be as small as possible, so as to minimally perturb the optical mode supported by the first waveguide. The first waveguide is gradually narrowed while the second waveguide is gradually widened, and as a result, light is gradually moved from the first waveguide into the second waveguide. Once the optical mode is sufficiently confined within the second waveguide, the first waveguide is terminated. However, both the abrupt introduction of the second waveguide and the abrupt termination of the first waveguide generate substantial back-reflections, which can potentially be on the order of −30 dB, for example.

The present adiabatic optical waveguide couplers improve upon prior waveguide coupler devices by achieving high-efficiency transitioning of light among the waveguides, with ultra-low back-reflections. The back-reflections of prior waveguide coupler devices are reduced by multiple orders of magnitude in the present adiabatic waveguide couplers by introducing a second degree of freedom, namely the physical separation between the two waveguides of the coupler. In the present waveguide coupler, when the second waveguide is introduced, it is initially positioned far away from the first waveguide, and before the waveguide widths are modified, the second waveguide is brought gradually into proximity with the first waveguide. Similarly, after the two waveguide widths have been modified, the first waveguide is gradually moved away from the second waveguide before being terminated.

In one approach to making the present adiabatic waveguide coupler, an integrated photonics chip is fabricated through one of several well-established techniques. The design of the lithography mask files for the chip includes the structure of the adiabatic waveguide coupler. Instead of abruptly introducing waveguides for cross-coupling, the waveguides are gradually brought into and out of proximity with each other in the present adiabatic waveguide couplers. This reduces back-reflection, improving performance and allowing the adiabatic waveguide couplers to be used in more applications, including resonator fiber optic gyroscopes (RFOGs).

To characterize the back-reflection of the adiabatic waveguide couplers, optical back-scatter reflectometry (OBR) can be employed. In OBR, light can be injected into the adiabatic waveguide coupler by aligning an optical fiber to an exposed facet of an integrated photonics chip where the coupler is employed.

As mentioned previously, this reduction of back-reflection is needed to optimize the performance of an integrated photonics-containing RFOG. This is an emerging embodiment of the RFOG with high potential to reduce cost and improve both performance and manufacturability.

Further details of various embodiments are described hereafter with reference to the drawings.

FIG. 1 illustrates an adiabatic optical waveguide coupler 100, according to one embodiment. The waveguide coupler 100 comprises an adiabatic waveguide structure 102 having a proximal end 104 and a distal end 106. The waveguide structure 102 comprises a first waveguide 110, and a second waveguide 120 separate from but adjacent to first waveguide 110.

The first waveguide 110 includes an input section 112 at proximal end 104, and a first coupling section 114 contiguous with input section 112 and extending toward distal end 106. A first laterally displaced section of first waveguide 110, such as a first curvilinear section 116, is contiguous with first coupling section 114 and terminates adjacent to distal end 106. The first waveguide 110 narrows along first coupling section 114, from input section 112 to curvilinear section 116. As shown in FIG. 1, curvilinear section 116 diverges away from first coupling section 114.

In one embodiment, first waveguide 110 has a first width $w_1$ along input section 112, and a second width $w_2$ along curvilinear section 116 that is less than the first width $w_1$. The first waveguide 110 has a gradually decreasing width, between input section 112 with the first width $w_1$, and curvilinear section 116 with the second width $w_2$.

The second waveguide 120 includes a second laterally displaced section, such as a second curvilinear section 122, adjacent to proximal end 104, and a second coupling section 124 contiguous with curvilinear section 122 and extending toward distal end 106. An output section 126 is contiguous with second coupling section 124 and terminates at distal end 106. The second waveguide 120 widens along second coupling section 124, from curvilinear section 122 to output section 126. As shown in FIG. 1, curvilinear section 122 converges toward second coupling section 124.

In one embodiment, second waveguide 120 has the first width $w_1$ along output section 126, and the second width $w_2$ along curvilinear section 122 that is less than the first width $w_1$. The second waveguide 120 has a gradually increasing width, between curvilinear section 122 with the second width $w_2$ and output section 126 with the first width $w_1$.

As shown in FIG. 1, first and second waveguides 110 and 120 are generally in alignment and overlap with each other, except that curvilinear section 122 of second waveguide 120 is laterally displaced away from input section 112, and curvilinear section 116 of first waveguide 110 is laterally displaced away from output section 126 of second waveguide 120. A distance between curvilinear section 122 and first waveguide 110 narrows until curvilinear section 122 comes into proximity and is aligned with first waveguide 110, where curvilinear section 122 is joined with second coupling section 124. Similarly, a distance between curvilinear section 116 and second waveguide 120 narrows until curvilinear section 116 comes into proximity and is aligned with second waveguide 120, where curvilinear section 116 is joined with first coupling section 114.

The first and second waveguides 110 and 120 can be composed of various higher refractive index optically transmissive materials. Examples of such materials include silicon, silicon nitride (SiNx), silicon oxynitride (SiON), silicon carbide (SiC), diamond, silicon germanium (SiGe), germanium, gallium arsenide (GaAs), gallium nitride (GaN), gallium phosphide (GaP), lithium niobate ($LiNbO_3$), titanium dioxide ($TiO_2$), or combinations thereof.

In some embodiments, the first and second waveguides 110 and 120 can each have a thickness of about 40 nm to about 500 nm.

In one embodiment, waveguide structure 102 can be surrounded by and embedded in a cladding layer 130. The cladding 130 can be composed of various lower refractive index materials. Examples of such materials include silicon dioxide ($SiO_2$), silicon oxynitride (SiON), zinc oxide (ZnO) (used with Si waveguide or other similarly high index waveguide), aluminum oxide ($Al_2O_3$), calcium fluoride ($CaF_2$), or combinations thereof Various methods can be used to fabricate adiabatic optical waveguide coupler 100, such as plasma enhanced chemical vapor deposition (PECVD), sputtering, low pressure CVD, atomic layer deposition, combinations thereof, or the like.

During operation of optical waveguide coupler 100, light is injected into input section 112 and propagates into first coupling section 114 of first waveguide 110. The light begins coupling into second coupling section 124 of second waveguide 120, where the waveguides start to overlap. The second coupling section 124 continues to widen along second waveguide 120, while coupling section 114 continues to narrow along first waveguide 110. This adiabatically converts the mode from first waveguide 110 to second waveguide 120. The light then propagates through output section 126 of second waveguide 120.

Because of the geometric variation provided by curvilinear section 122, the guided mode in first waveguide 110 does not see the start of second waveguide 120. Likewise, because of curvilinear section 116, the guided mode in second waveguide 120 does not see the end of first waveguide 110. Thus, the mode conversion gradually transitions from first waveguide 110 to second waveguide 120. This avoids discreet, abrupt perturbations in the guided mode, such as produced by prior optical couplers, which resulted in large back-reflections.

In various alternative embodiments of the present adiabatic optical waveguide coupler, such as optical waveguide coupler 100, the laterally displaced sections of the waveguides can have different shapes. For example, the displaced sections converge or diverge along the waveguide structure, such as linearly, curvilinearly, or the like. The displaced sections can have curvilinear shapes defined by a function comprising a sigmoid function, a quadratic function, polynomial function, or the like. The sigmoid function defines a sigmoid or "S"-shaped curve. The quadratic function defines a parabolic or "U"-shaped curve. A polynomial function can define a curve of varying shapes.

Figure 2A:
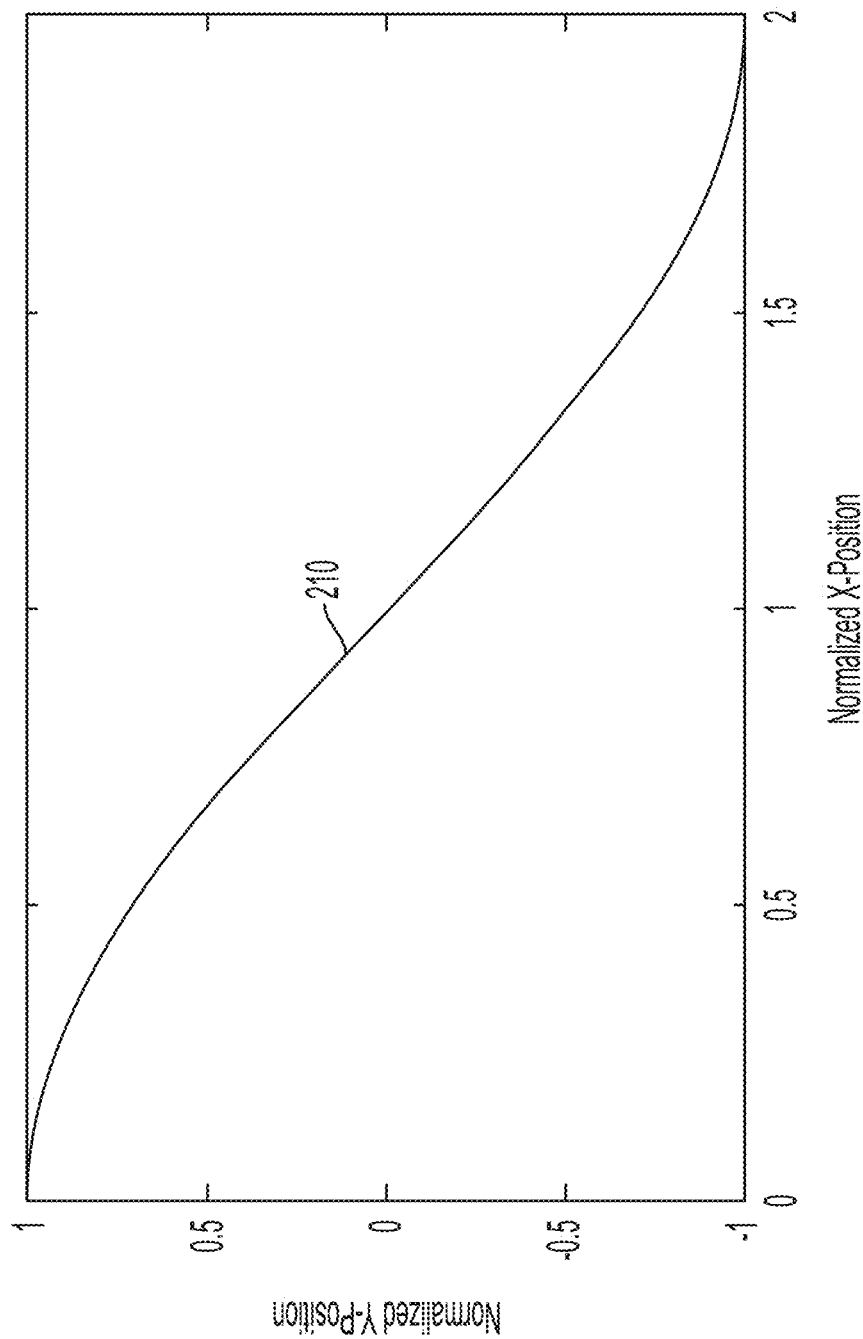
FIGS. 2A-2C are graphical representations of the shapes of laterally displaced sections in adiabatic optical waveguide couplers, according to various alternative embodiments.
Figure 2B:
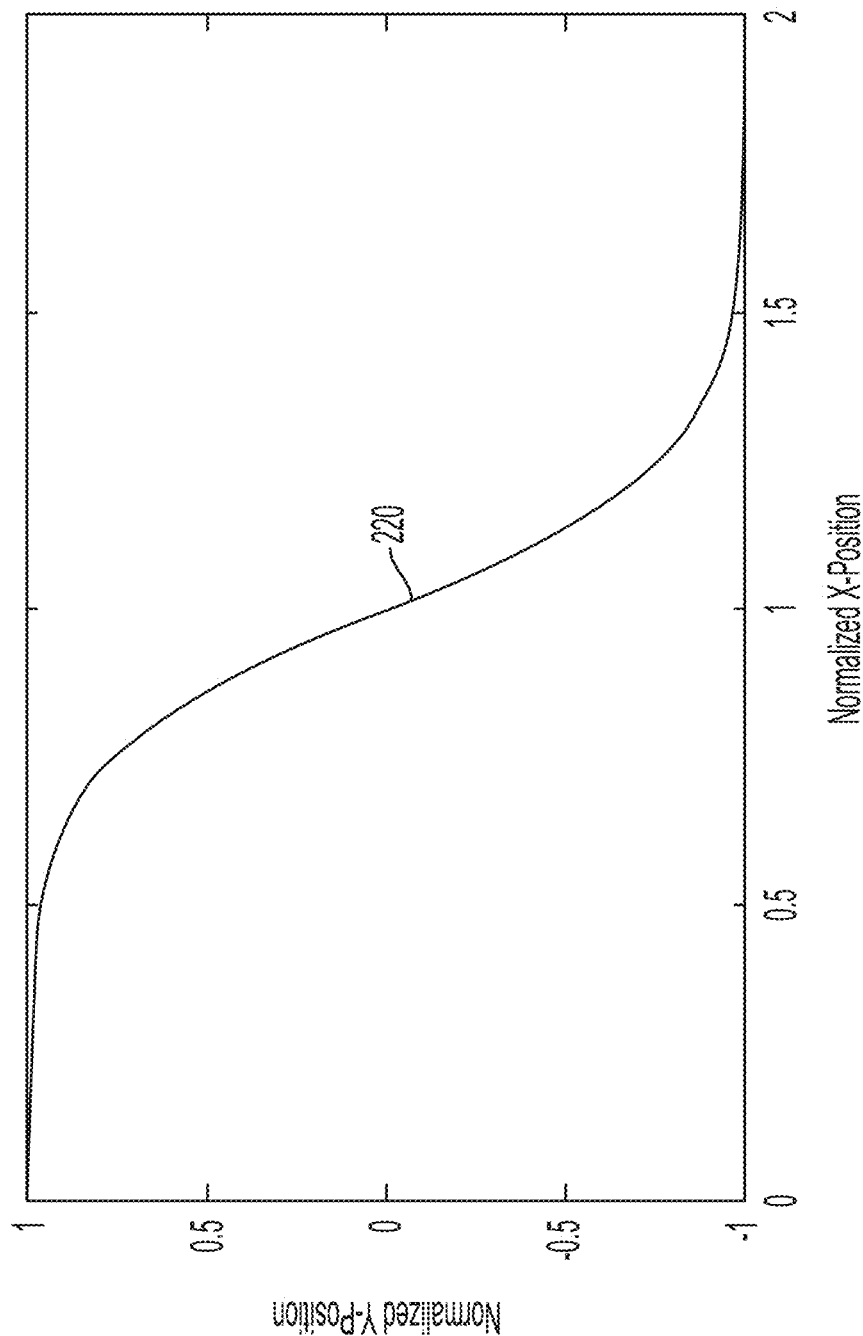
Figure 2C:
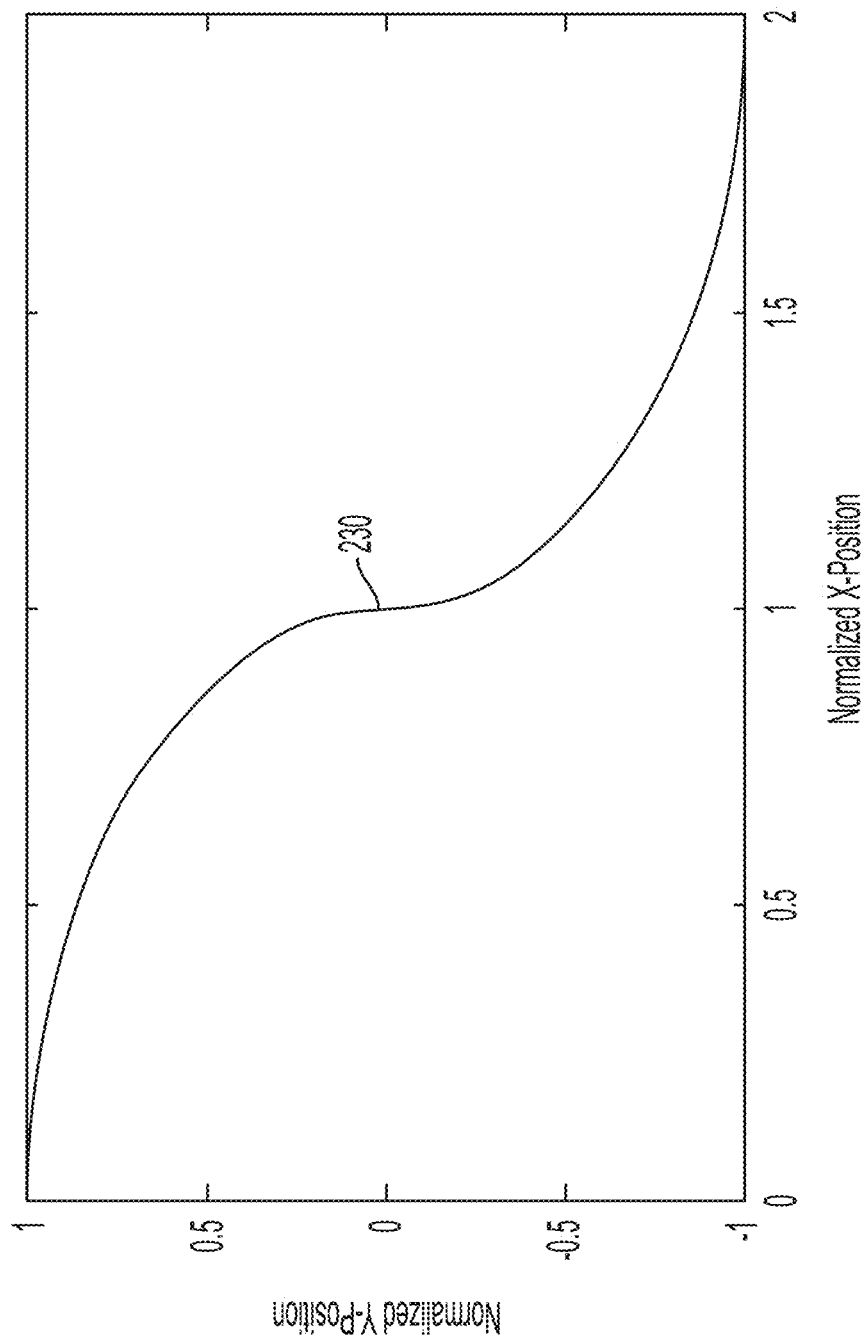

FIGS. 2A-2C are graphical representations of exemplary shapes that the laterally displaced sections in the optical waveguide coupler can have, according to various alternative embodiments. The exemplary shapes are represented by curves in FIGS. 2A-2C, which are defined with respect to normalized x-positions and normalized y-positions.

FIG. 2A depicts an exemplary shape of the displaced sections, which is represented by a sinusoidal curve 210. For example, the displaced section of the first waveguide can have a sinusoidal shape, which diverges away from the first coupling section, and the displaced section of the second waveguide can have a sinusoidal shape, which converges toward the second coupling section.

FIG. 2B depicts another exemplary shape of the displaced sections, which is represented by a hyperbolic tangent curve 220. For example, the displaced section of the first waveguide can have a hyperbolic tangent shape, which diverges away from the first coupling section, and the displaced section of the second waveguide can have a hyperbolic tangent shape, which converges toward the second coupling section.

FIG. 2C depicts a further exemplary shape of the displaced sections, which is represented by a circular curve 230. For example, the displaced section of the first waveguide can have a circular shape, which diverges away from the first coupling section, and the displaced section of the second waveguide can have a circular shape, which converges toward the second coupling section.

The different curvatures for the displaced sections of the optical waveguide coupler might be better suited for various applications, depending on the specific nature of the waveguide mode.

The present approach is also beneficial when the two waveguides of the optical waveguide coupler are made of different materials. For example, the displaced sections of the two waveguides improves the coupling function when light transitions between the two waveguides made of different materials.

Figure 3A:
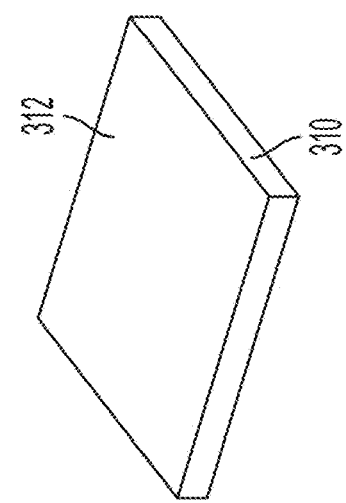
FIGS. 3A-3M are schematic orthogonal views of an exemplary method for fabricating an adiabatic optical waveguide coupler.
Figure 3B:
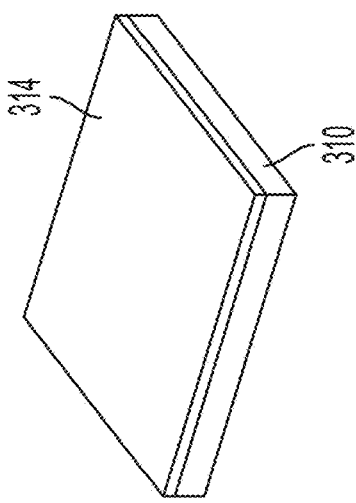

FIGS. 3A-3M depict an exemplary method for fabricating an adiabatic optical waveguide coupler. Fabrication of the adiabatic optical waveguide coupler begins with providing a wafer substrate 310 having an upper surface 312, as shown in FIG. 3A. The wafer substrate 310 can be formed of a first material having a lower refractive index, such as silicon dioxide, for example. Next, a first waveguide layer 314 is formed by depositing a second material on upper surface 312 of wafer substrate 310, as shown in FIG. 3B. The second material can be formed of a higher refractive index than that of the first material. For example, the second material can be silicon nitride deposited to have a thickness of about 40 nm to 500 nm on a silicon dioxide wafer using PECVD.

Figure 3C:
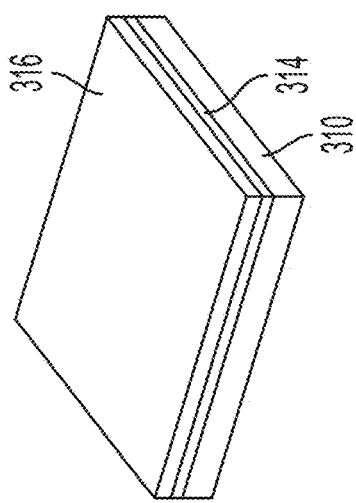
Figure 3D:
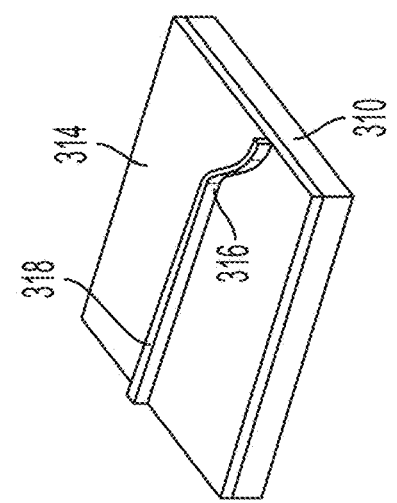
Figure 3E:
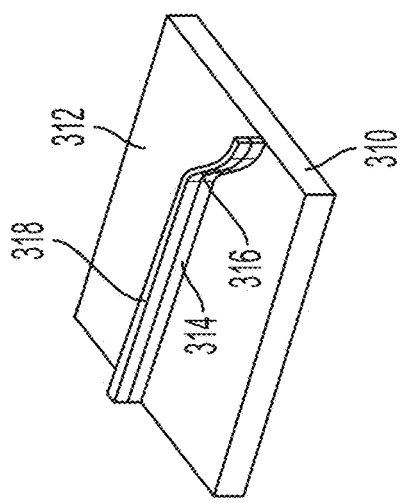
Figure 3F:
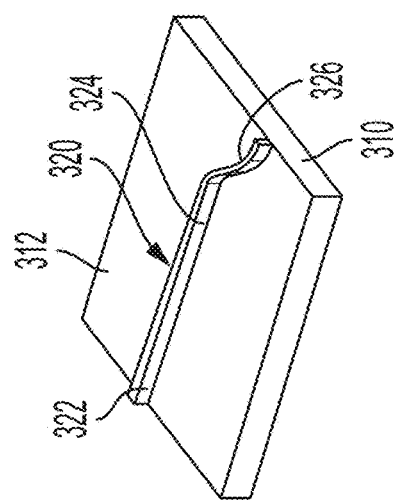

As depicted in FIG. 3C, a first resist layer 316 is then formed over first waveguide layer 314, such as by resist spinning. Thereafter, a first waveguide pattern 318 is formed in first resist layer 316, as shown in FIG. 3D, such as by standard lithography and development techniques. A first etch step is then performed to remove excess material of first waveguide layer 314 that is not under waveguide pattern 318, as illustrated in FIG. 3E. Next, a first resist removal step is performed to remove the resist material of first waveguide pattern 318, leaving a first waveguide structure 320, as depicted in FIG. 3F. The first waveguide structure 320 can be formed with an input section 322, a first coupling section 324, and a first laterally displaced section such as a curvilinear section 326.

Figure 3G:
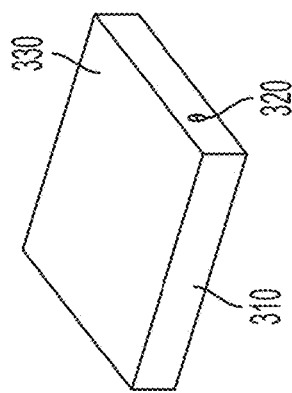

As shown in FIG. 3G, a first cladding layer 330 is then formed over first waveguide structure 320 and upper surface 312 of wafer substrate 310, such as by depositing the same first material as used for wafer substrate 310. For example, first cladding layer 330 can be formed by depositing a layer of silicon dioxide having a thickness of about 100 nm to about 1μm. Thereafter, a second waveguide layer 334 is formed by depositing the second material, having the higher refractive index, over cladding layer 330, as shown in FIG. 3H. For example, the second material can again be silicon nitride deposited to have a thickness of about 40 nm to about 500 nm on a silicon dioxide cladding layer using PECVD.

Figure 3I:
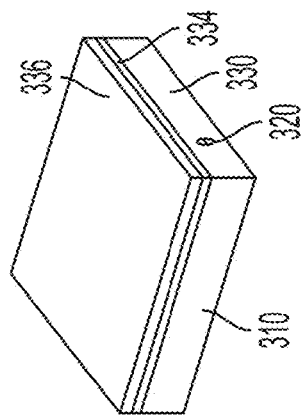
Figure 3H:
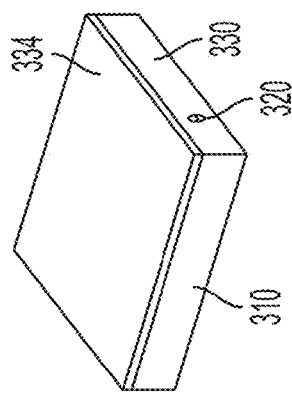
Figure 3J:
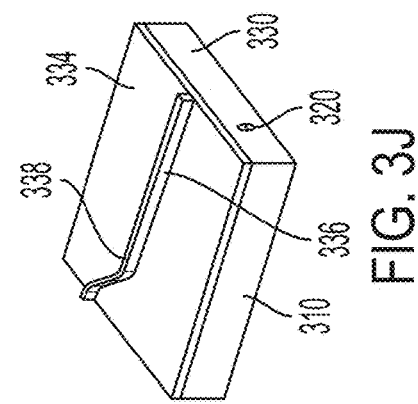
Figure 3K:
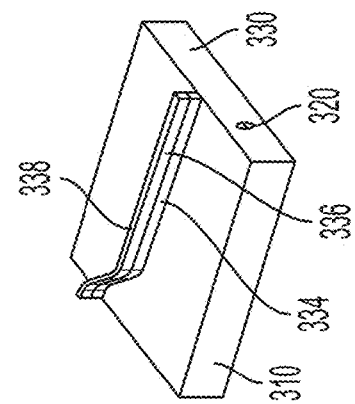
Figure 3L:
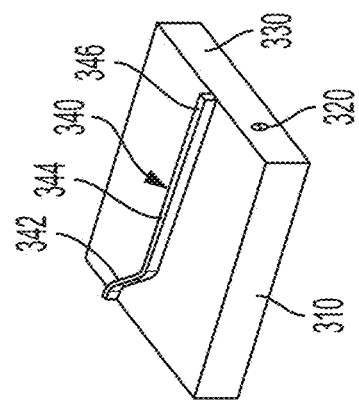

Next, a second resist layer 336 is formed over second waveguide layer 334, as depicted in FIG. 3I, such as by resist spinning. A second waveguide pattern 338 is then formed in second resist layer 336, as shown in FIG. 3J, such as by standard lithography and development techniques. Thereafter, a second etch step is performed to remove excess material of second waveguide layer 334 that is not under waveguide pattern 338, as depicted in FIG. 3K. A second resist removal step is then performed to remove the resist material of second waveguide pattern 338, leaving a second waveguide structure 340, as depicted in FIG. 3L. The second waveguide structure 340 can be formed with a second laterally displaced section such as a curvilinear section 342, a second coupling section 344, and an output section 346.

Figure 3M:
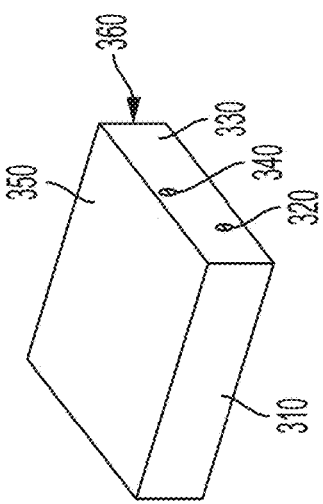

Finally, an additional amount of the first material, such as silicon dioxide, is deposited over second waveguide structure 340 to form a second cladding layer 350, as depicted in FIG. 3M. For example, second cladding layer 350 can be formed by depositing a layer of silicon dioxide having a thickness of about 100 nm to about 10μm. This results in a fabricated adiabatic optical waveguide coupler 360.

Figure 4:
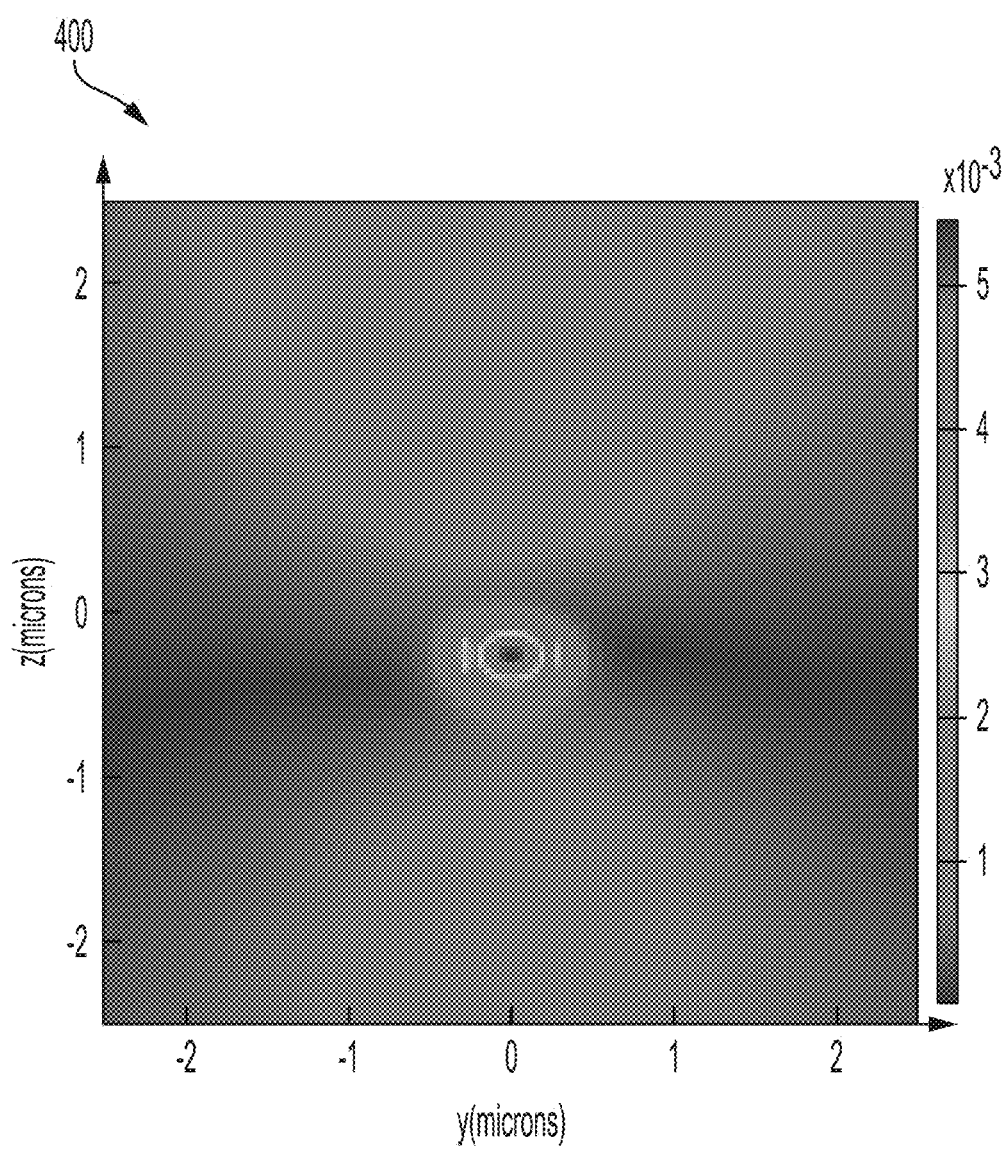
FIG. 4 is a modeled graphical representation of the simulated performance of a conventional adiabatic waveguide coupler.

FIG. 4 is a modeled graphical representation 400 of the simulated performance of a conventional adiabatic waveguide coupler, such as described previously. FIG. 4 shows the back-reflected field of the conventional adiabatic waveguide coupler. The reflection was determined to be −55.1 dB.

Figure 5:
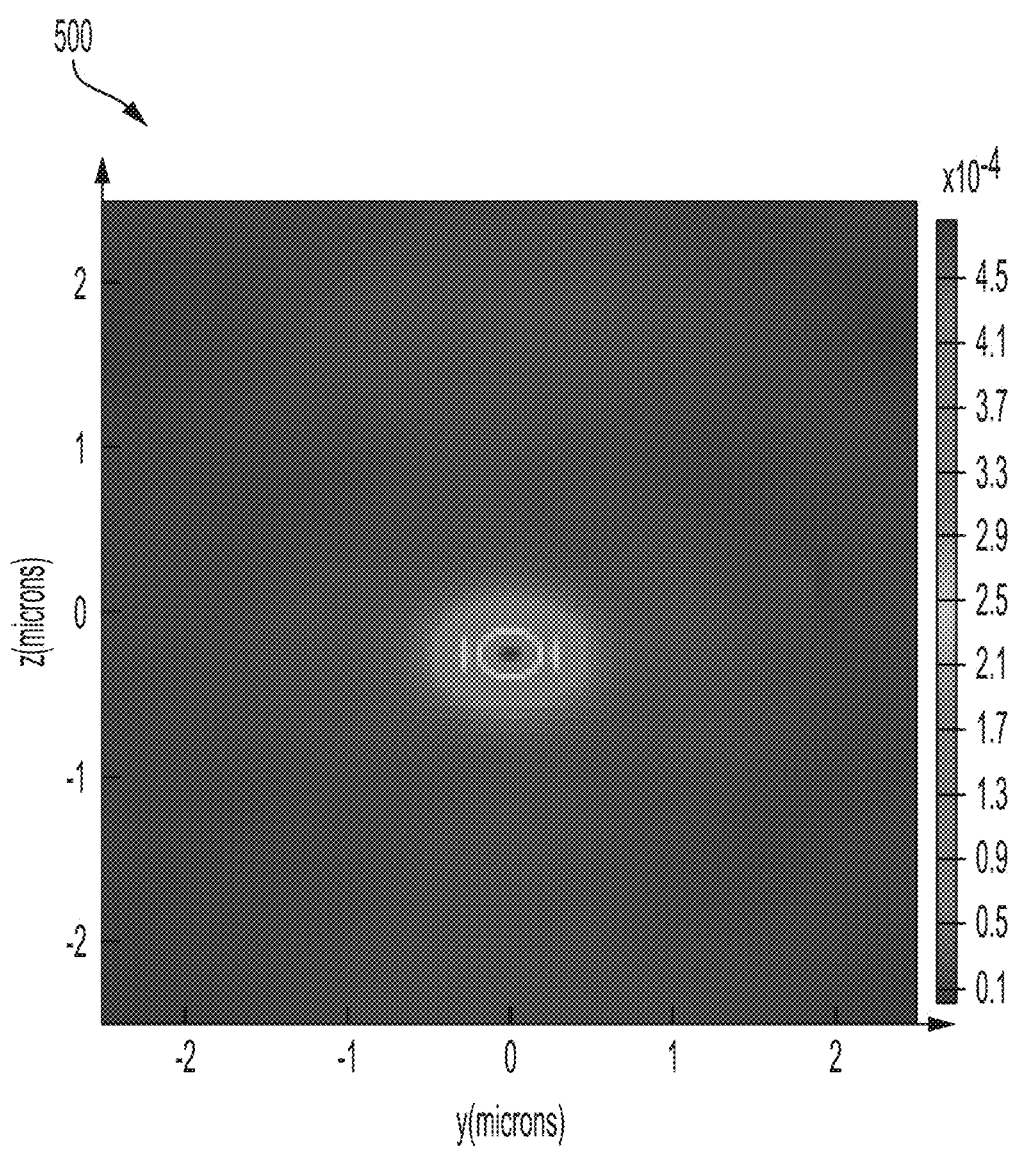
FIG. 5 is a modeled graphical representation of the simulated performance of an adiabatic optical waveguide coupler according to the present approach.

FIG. 5 is a modeled graphical representation 500 of the simulated performance of an adiabatic waveguide coupler according to the present approach. FIG. 5 shows the back-reflected field of the present adiabatic waveguide coupler. Here, the reflection was determined to be −77.9 dB.

As illustrated by FIGS. 4 and 5, the simulation results indicate that the present adiabatic waveguide coupler can yield much lower levels of back-reflection than a conventional adiabatic waveguide coupler. For example, the reflection of the present adiabatic waveguide coupler (FIG. 5) was down about 23 dB compared to the conventional adiabatic waveguide coupler (FIG. 4) (difference between −55.1 dB and −77.9 dB).

FIG. 4 also shows a higher back-reflection in the waveguide mode for the conventional adiabatic waveguide coupler, and additional back-reflection into the cladding of the waveguide coupler, than in FIG. 5 for the present adiabatic waveguide coupler. The scale bars on the right side of FIGS. 4 and 5 indicate that the back-reflected field in the conventional adiabatic waveguide coupler is higher, with the peak field amplitude being higher by a little over one order of magnitude, compared to that of the present adiabatic waveguide coupler.

EXAMPLE EMBODIMENTS

Example 1 includes an optical coupler, comprising: an adiabatic waveguide structure having a proximal end and a distal end, the adiabatic waveguide structure comprising: a first waveguide comprising: an input section at the proximal end; a first coupling section contiguous with the input section and extending toward the distal end; and a first laterally displaced section contiguous with the first coupling section and terminating adjacent to the distal end; wherein the first waveguide narrows along the first coupling section, from the input section to the first laterally displaced section; and a second waveguide separate from the first waveguide, the second waveguide comprising: a second laterally displaced section adjacent to the proximal end; a second coupling section contiguous with the second laterally displaced section and extending toward the distal end; and an output section contiguous with the second coupling section and terminating at the distal end; wherein the second waveguide widens along the second coupling section, from the second laterally displaced section to the output section.

Example 2 includes the optical coupler of Example 1, wherein the first waveguide and the second waveguide each comprise a higher refractive index material.

Example 3 includes the optical coupler of any of Examples 1-2, wherein the first waveguide and the second waveguide are each composed of the same material.

Example 4 includes the optical coupler of any of Examples 1-2, wherein the first waveguide and the second waveguide are each composed of a different material.

Example 5 includes the optical coupler of any of Examples 1-4, wherein the first waveguide and the second waveguide each comprise silicon, silicon nitride, silicon oxynitride, silicon carbide, diamond, silicon germanium, germanium, gallium arsenide, gallium nitride, gallium phosphide, lithium niobate, titanium dioxide, or combinations thereof.

Example 6 includes the optical coupler of any of Examples 1-5, wherein the first and second waveguides each have a thickness of about 40 nm to about 500 nm.

Example 7 includes the optical coupler of any of Examples 1-6, wherein: the first laterally displaced section of the first waveguide comprises a linear shape or a curvilinear shape that diverges away from the first coupling section; and the second laterally displaced section of the second waveguide comprises a linear shape or a curvilinear shape that converges toward the second coupling section.

Example 8 includes the optical coupler of any of Examples 1-7, wherein the first and second laterally displaced sections have curvilinear shapes defined by a function comprising a sigmoid function, a quadratic function, or a polynomial function.

Example 9 includes the optical coupler of any of Examples 1-8, wherein the first and second laterally displaced sections have curvilinear shapes comprising sinusoidal shapes, hyperbolic tangent shapes, or circular shapes.

Example 10 includes the optical coupler of any of Examples 1-9, wherein the first waveguide and the second waveguide are embedded in a cladding layer.

Example 11 includes the optical coupler of Example 10, wherein the cladding layer comprises a lower refractive index material.

Example 12 includes the optical coupler of any of Examples 10-11, wherein the cladding layer comprises silicon dioxide, silicon oxynitride, zinc oxide, aluminum oxide, calcium fluoride, or combinations thereof.

Example 13 includes the optical coupler of any of Examples 1-12, wherein the adiabatic waveguide structure is implemented in an integrated photonics chip.

Example 14 includes a method of fabricating an optical coupler, the method comprising: providing a wafer substrate having an upper surface, the wafer substrate formed of a first material having a first refractive index; forming a first waveguide layer of a second material on the upper surface of the wafer substrate, the second material having a second refractive index that is higher than the first refractive index; removing portions of the second material from the first waveguide layer to form a first waveguide structure, wherein the first waveguide structure is formed with an input section, a first coupling section contiguous with the input section, and a first curvilinear section contiguous with the first coupling section; forming a first cladding layer of the first material over the first waveguide structure; forming a second waveguide layer of the second material over the first cladding layer; removing portions of the second material from the second waveguide layer to form a second waveguide structure, wherein the second waveguide structure is formed with a second curvilinear section, a second coupling section contiguous with the second curvilinear section, and an output section contiguous with the second coupling section; and forming a second cladding layer of the first material over the second waveguide structure; wherein the first waveguide structure is formed to narrow along the first coupling section, from the input section to the first curvilinear section; wherein the second waveguide structure is formed to widen along the second coupling section, from the second curvilinear section to the output section.

Example 15 includes the method of Example 14, wherein removing portions of the second material from the first waveguide layer to form the first waveguide structure comprises: forming a first resist layer over the first waveguide layer; forming a first waveguide pattern in the first resist layer; removing portions of the second material from the first waveguide layer that are not under the first waveguide pattern; and removing the first resist material of the first waveguide pattern to expose the first waveguide structure on the wafer substrate.

Example 16 includes the method of any of Examples 14-15, wherein removing portions of the second material from the second waveguide layer to form the second waveguide structure comprises: forming a second resist layer over the second waveguide layer; forming a second waveguide pattern in the second resist layer; removing portions of the second material from the second waveguide layer that are not under the second waveguide pattern; and removing the second resist material of the second waveguide pattern to expose the second waveguide structure on the first cladding layer.

Example 17 includes the method of any of Examples 14-16, wherein the first material comprises silicon dioxide, silicon oxynitride, zinc oxide, aluminum oxide, calcium fluoride, or combinations thereof.

Example 18 includes the method of any of Examples 14-17, wherein the second material comprises silicon, silicon nitride, silicon oxynitride, silicon carbide, diamond, silicon germanium, germanium, gallium arsenide, gallium nitride, gallium phosphide, lithium niobate, titanium dioxide, or combinations thereof.

Example 19 includes the method of any of Examples 14-18, wherein the waveguide layers and the cladding layers are formed by a process comprising plasma enhanced chemical vapor deposition, sputtering, low pressure chemical vapor deposition, atomic layer deposition, or combinations thereof.

Example 20 includes the method of any of Examples 14-19, wherein the portions of the second material are removed from the first and second waveguide layers by a process comprising a lithography-based procedure, followed by dry etching.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. An optical coupler, comprising:
    an adiabatic waveguide structure having a proximal end and a distal end, the adiabatic waveguide structure comprising:
        a first waveguide comprising:
            an input section at the proximal end;
            a first coupling section contiguous with the input section and extending toward the distal end; and a first laterally displaced section contiguous with the first coupling section and terminating adjacent to the distal end;

wherein the first waveguide narrows along the first coupling section, from the input section to the first laterally displaced section; and a second waveguide separate from the first waveguide, the second waveguide comprising:

a second laterally displaced section adjacent to the proximal end;

a second coupling section contiguous with the second laterally displaced section and extending toward the distal end; and an output section contiguous with the second coupling section and terminating at the distal end;

wherein the second waveguide widens along the second coupling section, from the second laterally displaced section to the output section.

2. The optical coupler of claim 1, wherein the first waveguide and the second waveguide each comprise a higher refractive index material.

3. The optical coupler of claim 1, wherein the first waveguide and the second waveguide are each composed of the same material.

4. The optical coupler of claim 1, wherein the first waveguide and the second waveguide are each composed of a different material.

5. The optical coupler of claim 1, wherein the first waveguide and the second waveguide each comprise silicon, silicon nitride, silicon oxynitride, silicon carbide, diamond, silicon germanium, germanium, gallium arsenide, gallium nitride, gallium phosphide, lithium niobate, titanium dioxide, or combinations thereof.

6. The optical coupler of claim 1, wherein the first and second waveguides each have a thickness of about 40 nm to about 500 nm.

7. The optical coupler of claim 1, wherein:

the first laterally displaced section of the first waveguide comprises a linear shape or a curvilinear shape that diverges away from the first coupling section; and the second laterally displaced section of the second waveguide comprises a linear shape or a curvilinear shape that converges toward the second coupling section.

8. The optical coupler of claim 1, wherein the first and second laterally displaced sections have curvilinear shapes defined by a function comprising a sigmoid function, a quadratic function, or a polynomial function.

9. The optical coupler of claim 1, wherein the first and second laterally displaced sections have curvilinear shapes comprising sinusoidal shapes, hyperbolic tangent shapes, or circular shapes.

10. The optical coupler of claim 1, wherein the first waveguide and the second waveguide are embedded in a cladding layer.

11. The optical coupler of claim 10, wherein the cladding layer comprises a lower refractive index material.

12. The optical coupler of claim 10, wherein the cladding layer comprises silicon dioxide, silicon oxynitride, zinc oxide, aluminum oxide, calcium fluoride, or combinations thereof.

13. The optical coupler of claim 1, wherein the adiabatic waveguide structure is implemented in an integrated photonics chip.

* * * * *